United States Patent [19]

Abe et al.

[11] Patent Number: 4,784,461
[45] Date of Patent: Nov. 15, 1988

[54] OPTICAL CABLE WITH IMPROVED STRENGTH

[75] Inventors: Koichi Abe, Ottawa; Brian Braham, Saskatoon, both of Canada

[73] Assignee: Northern Telecom Limited, Montreal, Canada

[21] Appl. No.: 27,276

[22] Filed: Mar. 17, 1987

Related U.S. Application Data

[63] Continuation-in-part of Ser. No. 926,494, Nov. 4, 1986, abandoned.

[51] Int. Cl.⁴ ................................................. G02B 6/44
[52] U.S. Cl. ................................................. 350/96.23
[58] Field of Search ..................................... 350/96.23

[56] References Cited

U.S. PATENT DOCUMENTS

| | | | |
|---|---|---|---|
| 4,361,381 | 11/1982 | Williams | 350/96.23 |
| 4,401,366 | 8/1983 | Hope | 350/96.23 |
| 4,408,828 | 10/1983 | Le Noane et al. | 350/96.23 |
| 4,422,889 | 12/1983 | Trezeguet et al. | 156/70 |
| 4,474,426 | 10/1984 | Yataki | 350/96.23 |
| 4,661,406 | 4/1987 | Gruhn et al. | 428/397 |

Primary Examiner—Stanley D. Miller
Assistant Examiner—Richard Roseen
Attorney, Agent, or Firm—R. J. Austin

[57] ABSTRACT

Optical cable having a central core with grooves along the outside, the grooves housing tubes containing optical fibers. The grooves are inclined to the core axis and preferably are sinusoidal in that they extend around the core in each direction while extending axially and do not complete a revolution around the core before changing direction. In preferred structures, the tubes contact around a concave base surface of the grooves or contact opposing groove walls. In addition, the tubes provide greater strength if they are in a load transmitting relationship with a metal sheath if there is one. The structure also allows for a different water blocking material to be used within the tubes than outside the tubes and within the grooves so as to satisfy different property requirements.

15 Claims, 3 Drawing Sheets

OPTICAL CABLE WITH IMPROVED STRENGTH

This application is a continuation-in-part of U.S. patent application Ser. No. 926,494, filed Nov. 4, 1986, now abandoned.

This invention relates to optical cables.

Optical cables comprise a plurality of optical fibers and some protective support for the fibers. To provide support, some cable structures have a central core provided with a plurality of circumferentially spaced ribs which extend along the core and project outwardly from it. Grooves defined between the ribs house one or more fibers. An example of this type of optical cable structure is described in U.S. Pat. No. 4,361,381 granted Nov. 30, 1982 and entitled "Optical Cable" in the name of R. J. Williams. This particular Patent is also concerned with the use of a protective sheath surrounding the core. In other cable structures, protective supports comprise tubes to house the fibers. A cable may include one or more tube and fiber arrangements in its construction. In some cables, a single tube and its housed fibers may be disposed centrally within a further protective jacket or sheath surround, or alternatively, a plurality of tubes may be placed side-by-side around a central core unit.

The present invention seeks to provide an optical cable structure which lends itself conveniently to commercial manufacture and also provides maximum protection for optical fibers.

According to the present invention there is provided an optical cable comprising a longitudinally extending crush resistant central core formed with a plurality of circumferentially spaced, outwardly facing ribs with adjacent ribs defining grooves between them, the ribs and defined grooves extending longitudinally of the cable and lying at angles to the core axis; some of the grooves each housing a tube extending along the length of the groove; at least one optical fiber housed within and extending along each tube throughout the length of the cable; and a protective jacket surrounding the core.

The cable defined above according to the invention has various advantages. Certain advantages are found during commercial manufacture. For instance subassemblies of fibers within tubes may be made in the factory environment before the tubes are assembled to the cores and this may assist in simplifying inventory. Also the location of the tubes within the grooves of the core minimize or avoid certain technical difficulties in assembling optical fibers into grooves of such a core construction. Such difficulties are concerned with control in location of the fibers into associated grooves so as to prevent their displacement from their grooves and over the ends of the ribs. Such displacement of fibers may result in their becoming gripped between the ends of the ribs and any surrounding material such as a cable jacket, which may lead to attenuation problems. Because they are stiffer and of larger diameter than optical fibers, positional control of the tubes is more positively and easily effected.

The optical cable structure also provides greater resistance to deformation under compressive loads than has hitherto been found with other structures. The core and rib design is found to dissipate radially applied crushing loads from one side of the core to the other with the load being transmitted down the ribs and by-passing the fibers. In certain cases however, excessive crushing loads may be applied which tend to deform the ribs laterally i.e. into the grooves themselves, so as to reduce their size. In such cases the ribs obviously approach the fibers. In the inventive cable, the provision of the tubes within the grooves prevents or resists any deformation of the ribs from applying a crushing load to the fibers. If a tube becomes gripped between ribs then load becomes transmitted from one rib around the wall of the tube and then out through an adjacent rib. In the inventive construction, the tubes and the ribbed core coact in the above manner to transfer crushing loads from side-to-side of the cable while avoiding the fibers themselves. In preferred arrangements for helping in this load transmission, the tubes are firmly seated between the ribs so as to resist any deformation of the ribs immediately a crushing load is applied. In one construction where the tubes are firmly seated between the ribs, the core at the bases of the ribs defines concave surfaces which follow substantially circular paths and blend around bottoms of the grooves with side surfaces of the ribs, and the tubes lie in engagement with the concave surfaces at the bottoms of the grooves around a portion of the periphery of the tubes. Alternatively the tubes may be firmly seated with the tubes in contact with opposing side walls of the ribs.

The structure is further strengthened by the addition of a metal sheath surrounding the core, this sheath preferably having corrugations which extend circumferentially around the core. In the sheathed structure, the sheath is preferably in load transmitting contact with the tubes. In this case, if a tube is subjected to compression between the ribs, then the metal sheath provides further mechanical support for the tube by virtue of a further contact with the tube at a portion circumferentially spaced from its position of contact with ribs. The sheath thus helps in strengthening the tube while assisting in load transmission.

Conveniently, the ribs, grooves and tubes extend along the core in reverse helical manner, i.e. in which they extend at an angle to the core axis for a required distance along the core ad then reverse direction around the axis. In one arrangement, the ribs, grooves and tubes extend at an angle to the core axis and then reverse direction around the axis without completing a revolution of the core. In this specification, the latter arrangement is referred to as "sinusoidal" as distinct from "reverse helical". The location of the tubes in sinusoidal fashion is easily accomplished. The sinusoidal arrangement for the lay of the optical fibers is one which has been found to be most desirable in that it is the most convenient path for the optical fibers to follow for field repair and branch splicing purposes performed upon the cable. It is believed that great difficulty would be found, before this invention, in providing a sinusoidal arrangement for tubes around a core.

In constructions according to the invention also, where it is determined that water blocking materials should be used along the passageways formed by the grooves and the tubes, then it is possible to use a different water blocking material in the tubes from that used in the grooves. It will be appreciated that water blocking materials in the grooves may require different properties from materials in the tubes and cables according to the invention allow for the use of the different materials to optimize performance requirements, compatibility, manufacturability and costs.

The invention also includes a method of making cable comprising: providing a longitudinally extending crush resistant central core formed with a plurality of circumferentially spaced outwardly facing ribs with adjacent ribs defining between the longitudinally extending grooves, the ribs and grooves also extending at angles to the core axis; providing a plurality of tubes each housing at least one optical fiber; locating the tubes and their housed fibers within at least some of the grooves so as to extend along said grooves; and providing a protective jacket in a position surrounding the core.

Embodiments of the invention will now be described, by way of example, with reference to the accompanying drawings, in which.

Figure 1:
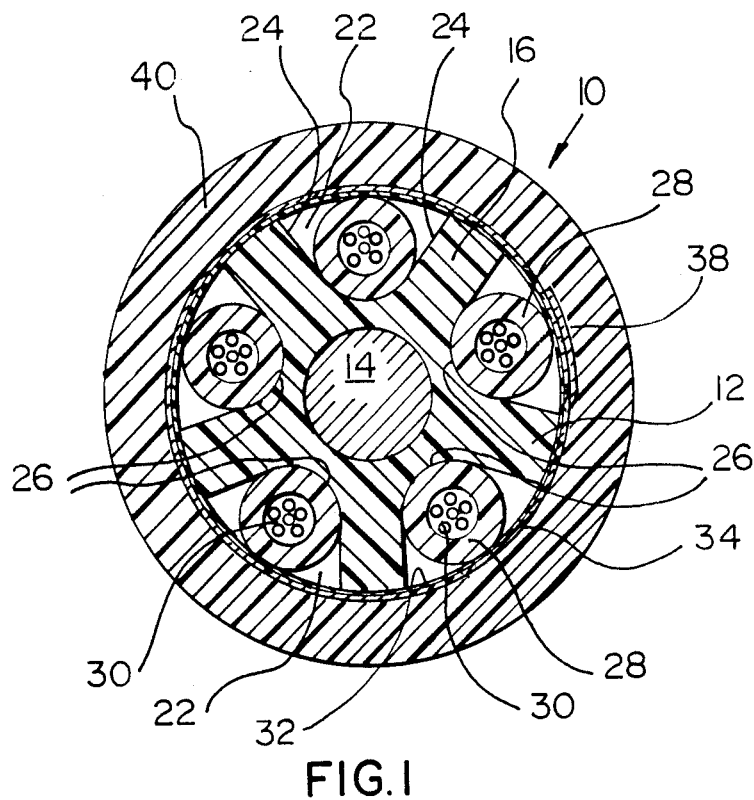
FIG. 1 is a cross-sectional view through an optical cable according to a first embodiment.
Figure 2:
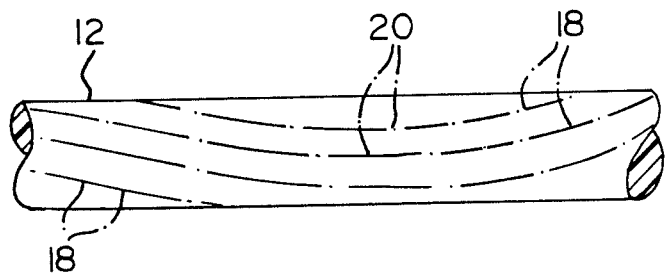
FIG. 2 is a diagrammatic side elevational view of a core of the cable of FIG. 1 and showing the longitudinal paths of grooves formed along the core.

In a first embodiment, as shown in FIG. 1, an optical cable 10 comprises a crush resistant core 12 surrounding a steel strength member 14, the core having been formed from extruded plastics material such as high density polyethylene. The core is extruded with a plurality, i.e. five, circumferentially spaced ribs 16 which extend longitudinally of the core. The ribs extend at angles to the core axis and for this purpose may extend strictly in a helical fashion longitudinally of the core. However in a preferred arrangement, as in this embodiment, the ribs extend in sinusoidal fashion so as to follow paths indicated in chain dotted outline 18 in FIG. 2. Thus the ribs, as they follow the sinusoidal paths extend longitudinally of the core firstly in one direction and then in the other direction around the core with smoothly curved parts 20 of the paths effecting the change in direction. In this embodiment, the outside diameter of the core including ribs is 9.0 mm. Each groove changes in direction around the core axis after completing a nominal angle of between 320° and 340° to the core axis.

The ribs define between them longitudinally extending grooves 22 (FIG. 1) and the ribs, of course, follow sinusoidal paths parallel to the paths of the ribs. Thus the paths of the grooves extend smoothly along the core with succeeding parts of the grooves which change in direction being joined by smoothly curving groove portions. As shown in FIG. 1, each of the grooves 22 widens as it extends away from the core axis by virtue of diverging opposing side surfaces 24 of adjacent ribs. At the bases of the ribs, the core defines concave surfaces 26 which make up the bottoms of grooves 22, follow a substantially circular path and blend around the bottoms of the grooves with the flat side surfaces 24 of the ribs.

Disposed within each of the grooves 22 is a plastics tube 28 which occupies a substantial proportion of the volumetric space of its associated groove. As shown in FIG. 1, each tube has a substantial Portion of its peripheral surface engaged by the concave surface 26 at the base of its groove. Extending along each tube are a plurality of optical fibers 30. The fibers do not completely fill the tubes and clearance is provided between the fibers and the inside surfaces of the tubes to allow for lateral movement of the fibers such as is required for the fibers to find the shortest path through the tubes in the event that the tubes are formed into a curved shape. In the embodiment, with the tubes following the sinusoidal paths of the grooves, the fibers tend to move from side-to-side in the tubes as well as in lateral direction to approach the minimum bend radius regions of the tubes and thus follow the shortest paths possible. The regions of the passages within the tubes unoccupied by fibers are substantially filled with a water blocking medium which may be any suitable grease or jelly type material, or alternatively a water blocking powder formulation. Also, the groove spaces unoccupied by tubes is filled with a water blocking medium. Each water blocking medium is omitted from the Figures for clarity.

Figure 3:
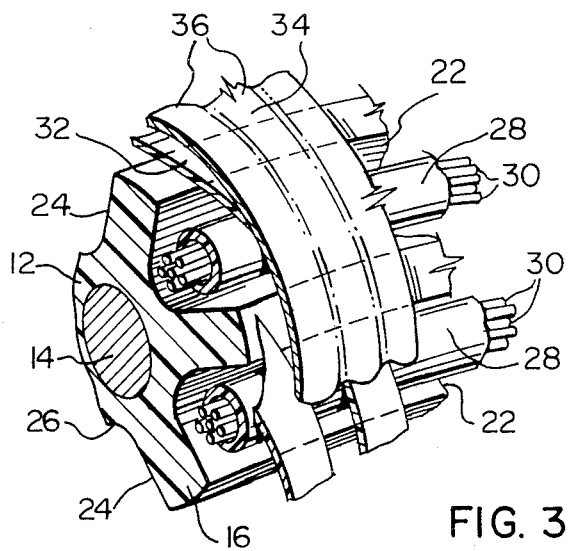
FIG. 3 is an isometric view of part of the cable of FIG. 1 with a surrounding jacket removed.

Immediately surrounding the core 12 is a conventional binding tape 32. Surrounding the core and binding tape is a metal sheath 34 which is formed with corrugations 36 (FIG. 3) which extend circumferentially around the core and are spaced apart longitudinally of the cable. As can be seen particularly from FIG. 1, the relative dimensions of the tubes 30 and the ribs 16 are such that the sheath 34 lies in load transmitting relationship with each of the tubes. The sheath is formed from steel and is coated on both surfaces with polyethylene. As can be seen from FIG. 1, the shield has overlapping edges 38. Immediately surrounding the sheath is an outer water impermeable polymeric jacket 40. The material of the jacket is compatible with the coating material on the sheath so as to blend with or bond with the coating material under the action of heat, such as is provided during extrusion of the jacket around the sheath enclosed core, the extrusion being performed in a conventional fashion for applying jackets. The jacket is advantageously formed from a polyolefin which in this case is of medium density polyethylene 1.4 mm thick. The heat in the polyethylene during extrusion is sufficient to cause softening of the outer coating on the metal so as to bond the jacket and coating. Also opposing coats on the metal which are in contact at the overlapping edges 38 are caused to flow together by virtue of heat of extrusion, thereby providing a moisture proof barrier between these ends.

The structure of the first embodiment may be assembled in the following manner.

Figure 4:
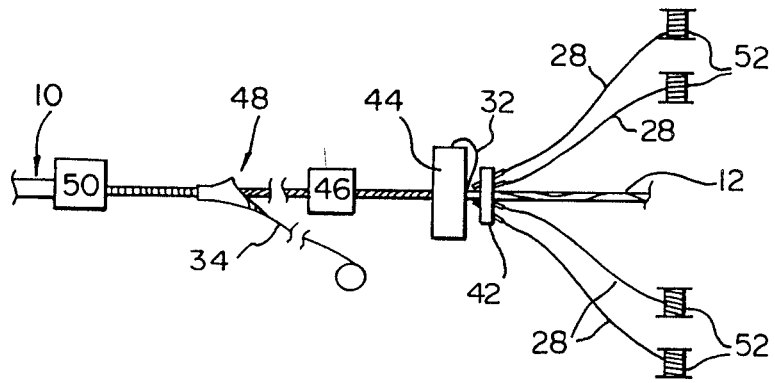
FIG. 4 is an enlarged cross-sectional view of part of the cable and showing the dissipation of compressive loads throughout the cable.

As shown by FIG. 4, the core 12 is moved along a passline through a laying structure 42 for laying the tubes into the grooves, through a binding head 44, a pressurized bath 46 of viscous water blocking compound and then through a sheath application station 48 and a jacket extruder head 50 for applying the jacket 40 from an extruder (not shown).

Reels 52 of the tube 28 and fiber 30 assemblies are rotatable in stationary locations to supply the fiber and water blocking medium filled tubes through the laying structure 42 and into the grooves 22. The laying structure 42 is not shown in detail in the Figures and may be similar in design and operation to that described in U.S. Pat. No. 4,483,134, granted Nov. 20, 1984 and entitled "Laying of Optical Waveguides onto a Support Filament" in the name of G. McKay et al.

As described in U.S. Pat. No. 4,483,134, the laying structure carries a freely rotatable annular laying head (not shown) with guide tubes or passages to align the tubes 28 with the grooves 22 and lay them correctly in their desired positions. The guide tubes or passages are similar to those described in U.S. Pat. No. 4,483,134, for guiding fibers into grooves of a core, except that the guide tubes or passages of structure 42 are of larger cross-sectional area or diameter to accommodate the tubes 28. The rotatable laying head also has teeth extending inwardly from it to engage within grooves 22 so as to cause the head to rotate and maintain its position relative to the grooves and thus maintain the guide tubes or passages in alignment with the sinusoidally moving grooves.

Immediately after leaving the laying structure 42, the core carrying the tubes and fibers passes through the binding head 44 which wraps the binding tape 32 around the core in conventional fashion. The core then passes through the bath 46 in which pressurized water blocking medium is forced between convolutions of the binding tape 32 to occupy any regions of the grooves not occupied by the tubes 28. The shield 34 is then wrapped around the core at station 4B and the extruded jacket 40 is applied at the extruder crosshead 50, both of these operations being in conventional manner.

The construction of the embodiment has numerous advantages.

These include convenience and ease of manufacture as shown by the above description. In particular, because the fibers may be assembled into their respective tubes prior to the assembly of the tubes onto the core, then the tube and fiber assemblies may be stored preparatory for assembly into the cable and this eases inventory control. In addition, during the manufacture of the cable, the tubes which are stiffer and of larger diameter than the individual optical fibers, are easier to lay in their respective grooves without any tendency for the tubes to move out of the grooves such as sometimes happens with individual fibers. Hence such problems normally associated with laying of the individual fibers are avoided.

Furthermore, a minimum amount of back tension is inevitably required when a fiber or a group of fibers is laid in a groove. When back tension is excessive, the fibers tend to be located at the position within the groove in such a manner that lateral and vertical freedom of movement (which is necessary to minimize fiber strain when the cable is subjected to strain) is smaller than the designed optimum.

In the cable of the embodiment (and according to the invention) an optimum design to maximize lateral and vertical freedom of movement is accomplished because of the tube which minimizes or eliminates the effects of back tension on the fiber position relative to the groove.

Further to this, during production it is clear that the ease of laying of the tubes into the grooves overcomes an outstanding practical problem in the laying of tubes in sinusoidal fashion. It is believed that no practical method of laying tubes in sinusoidal manner was known before the date of this invention. In conventional constructions employing tubes in reverse helical fashion, no tube locating grooves are provided and the tubes are merely laid around a Plain central support. Thus equipment is necessary for both laying the tubes in reverse helical fashion and for holding them in position preparatory to further processing steps involved with the application of metal sheaths and jackets around the laid tubes. Such equipment may tend to be complex in structure and in opera&ion. With the cable structure according to the embodiment and also according to the invention, the grooves provide guides for the tubes and no problem has been found in locating the tubes into the sinusoidal grooves. Furthermore, the tubes tend to be laid in position immediately before a subsequent step of laying the binding tape around the core which holds the tubes in position. The apparatus for assembly of the tubes into the grooves is therefore of simple construction. It will be appreciated that sinusoidal location of the tubes and thus of the optical fibers is, in some respects, a preferred requirement in an optical cable, particularly for field repair and branch splicing purposes. With the sinusoidal arrangement also, it is found that there is less tendency for the optical fibers to become tensioned by gripping around the core than there is with a truly helical or reverse helical arrangement of the fibers. It will be appreciated that any gripping action by the fibers upon the core may increase attenuation problems.

Additionally, the use of tubes to hold the fibers in the above construction provides for convenience of handling during field splicing of cables because of the control in the positions of the fibers by the tubes. Also the location of the tubes within the grooves enables for different water blocking materials to be used inside the tubes from outside the tubes. It will be appreciated that specific requirements may dictate that water blocking compounds should have different properties on the inside of the tubes from those outside the tubes.

For instance, for performance optimization, a compound to be used within the tubes should minimize microbend effects on fiber especially at low temperature ranges. This is not relevant to blocking compounds surrounding the tubes. Also, there should be compatibility between a water blocking medium and the tubes, the fiber and fiber coating material when the medium is within tubes whereas, outside the tubes, the water blocking medium needs to be compatible with the material of the tubes, the core, core wrap or binder, coating material on the sheath, and possibly the jacket. All of the above needs to be considered in the light of costs of water blocking medium and the ease of cable manufacture when different manufacturing considerations apply. For instance, the compound within the tubes needs to be applied simultaneously with tube extrusion and fiber insertion. The compound outside the tubes is associated with the stage of laying the fiber into the grooves and during sheath application as described above.

Of paramount importance, however, is the structural strength of the construction.

The structure of the cable is such that it may be flexed in normal manner for cable for laying purposes. However, it is particularly resistant to crushing loads such as may be applied by the pressure of rocks when the cable is buried beneath the ground. This crushing load resistance is far superior to that offered by the cable construction described in U.S. Pat. No. 4,361,381 granted Nov. 30, 1982 and entitled "Optical Cable" in the name of R. J. Williams.

Figure 5:
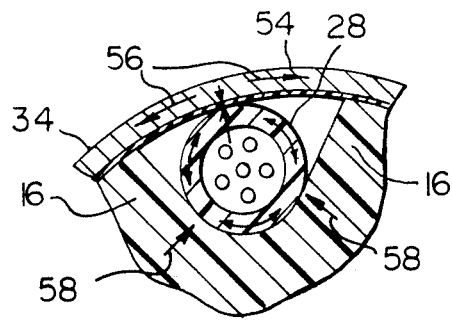
FIG. 5 is a view similar to FIG. 4 of a second embodiment.

In this embodiment, as can be seen from FIG. 5, the metal sheath is carried by the outer ends of the ribs 16. A circumferential part 54 of the sheath 34 extends between adjacent ribs and this part is in load transmitting relationship with a tube 28. Any crushing load acting upon a part 54 produces a bending moment which is minimized by the short distance between the ribs and this reduces any tendency for the corrugated metal to be deformed inwardly. The load is, in fact, taken mainly through the ribs, through the strength member 14 and out through other ribs diametrically opposite through the core. Further, the supporting contact of the ribs with the metal sheath at spaced positions, the wide area of contact between the ribs and the sheath and the fact that the ribs extend angularly around the core, assist in stiffening the metal sheath against inward deformation and resist any inward distortion of the sheath. Such deformation is, of course, also resisted by the corrugations in the sheath. In effect, therefore, the total arrangement of the corrugated sheath and the ribs on the core produce a strong box-like structure surrounding each of the grooves 22.

Should any crushing load act directly upon a part 54 of the sheath, then if any slight inward detection of this part takes place between adjacent ribs 16, this will place a small radially crushing load upon a tube 28. However the tube is strengthened by its peripheral contact with the core at the base of its groove, in a position diametrically opposite to its point of contact with the sheath 34, so as to stiffen the tube. Any small loads which may be transmitted from the sheath pass circumferentially around the tube thereby imposing hoop stresses in the tube and these loads are transferred into the core at the bases of the ribs. These loads are indicated by the arrows 56 in the tube shown in FIG. 5. Because of the small diameters of the tubes and their different positions of support around their circumference, then they are sufficiently strong and stiffened successfully to resist any expected crushing loads.

Alternatively if a load is applied in a different position such as to cause one of the ribs to deflect slightly in a lateral direction, then loads may be applied upon opposite sides of a tube by the adjacent ribs (arrows 58 in FIG. 5). These loads however are transmitted around the tube and as the tube lies in load transmitting relationship with the sheath, then this load is transferred into the sheath itself and is dissipated again, for instance as shown by arrows 56.

Thus it can be seen from the above explanation that the combination of the grooved core with a tubular enshrouded optic fiber structure provides a particularly strong and robust cable which is extremely efficient in protecting the fibers against any crushing loads which may normally be applied.

In a modification of the first embodiment, the binding tape 32 is replaced by a core wrap (not shown). This may be of 0.003 mm polyester which may be that sold under the registered trade mark "Mylar". With this structure, as it may be impossible to fill the grooves with a pressurized water blocking compound after application of the core wrap, a powder type water blocking compound may be placed into the grooves immediately before core wrap application. The powder may be added in the manner described in U.S. Pat. No. 4,401,366, granted Aug. 30, 1985, to T. S. Hope.

Figure 6:
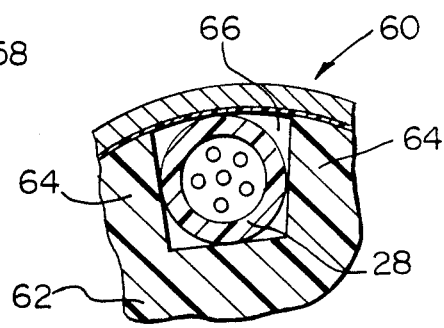
FIG. 6 is a view similar to FIG. 5 with parallel sided grooves.

In a second embodiment as shown in FIG. 6, which is otherwise similar to that of the first embodiment, a cable 60 has a core 62 provided with ribs 64 which define between them parallel sided grooves 66. In this structure, each tube 28 fits closely within its associated groove and has a three point contact with the groove, i.e. at the groove base and also at the two sides. In addition, the sheath is in load transmitting relationship with each tube so that each tube is supported at four longitudinally extending positions which are substantially equally spaced apart around its periphery. This also provides an extremely effective stiffening effect to the tubes which are able to resist crushing loads in a manner similar to that described with regard to the first embodiment.

It should be realized that the invention includes constructions in which, in an unloaded state, the tubes are not held closely within the grooves or between the grooves and the sheath. In such constructions (not shown) the tubes have some freedom to move laterally within their grooves, but should a substantial crushing load be applied to the cable then any deflection of the sheath or of a rib may cause contact with and apply a radial load to a tube. In such a case, the tube will be effective in dissipating the loads around the fibers and into the core and sheath of the cable in a manner similar to that discussed in the first embodiment.

What is claimed is:

1. An optical cable comprising a longitudinally extending crush resistant central core formed with a plurality of circumferentially spaced outwardly facing ribs with adjacent ribs defining grooves between them, the ribs and the defined grooves extending longitudinally of the cable and lying at angles to the core axis; some of the grooves each housing a tube extending along the length of the groove; at least one optical fiber housed within and extending along each tube throughout the length of the cable; and a protective jacket surrounding the core.

2. A cable according to claim 1 wherein the ribs and defined grooves extend along the core in sinusoidal manner.

3. A cable according to claim 1 wherein the tubes are located one in each groove with each tube firmly seated within its groove.

4. A cable according to claim 1 wherein the tubes are located one in each groove with each tube firmly seated against the base of its groove and in contact with opposed side walls of the ribs and a metal sheath surrounds the core and beneath the jacket, the metal sheath lying in contact with the tubes to transmit loads from the sheath into the tubes.

5. A cable according to claim 1 wherein, in a lateral cross-section of the cable, the core at the bases of the ribs defines concave surfaces which provide bottom surfaces of the grooves and follow substantially circular paths to blend around bottoms of the grooves with said surfaces of the ribs, one tube is disposed in each groove and each tube lies in engagement with its associated concave surface around a portion of the periphery of the tube, and a metal sheath surrounds the core and is disposed beneath the jacket, the metal sheath lying in load transmitting relationship with the tubes.

6. A cable according to claim 4 wherein the sheath is formed with corrugations which are spaced apart axially of the cable and extend circumferentially around the core.

7. A cable according to claim 5 wherein the sheath is formed with corrugations which are spaced apart axially of the cable and extend circumferentially around the core.

8. An optical cable according to claim 2 provided with a water blocking medium which substantially fills regions of the tubes unoccupied by fibers.

9. An optical cable according to claim 2 provided with a water blocking medium which substantially fills regions in each tube unoccupied by fibers and a water blocking medium which substantially fills regions in the grooves unoccupied by the tubes.

10. A method of making optical cable comprising: providing a longitudinally extending crush resistant central core formed with a plurality of circumferentially spaced outwardly facing ribs with adjacent ribs defining between them longitudinally extending grooves, the ribs and grooves also extending at angles to the core axis;

providing a plurality of tubes each housing at least one optical fiber;

locating the tubes and their housed fibers within at least some of the grooves so as to extend along said grooves; and providing a protective jacket in a position surrounding the core.

11. A method according to claim 10 comprising locating the tubes firmly within their grooves.

12. A method according to claim 11 comprising locating each tube firmly seated against the base of its groove and in contact with opposed side walls of ribs defining the associated groove, and providing a metal sheath around the core and beneath the jacket, the sheath contacting said tube to transmit loads to the tube.

13. A method according to claim 11 comprising locating each tube firmly seated against the base of its groove, and providing a metal sheath and around the core and beneath the jacket, the sheath contacting said tube to transmit loads to the tube.

14. A method according to claim 10 comprising substantially filling regions in the tubes unoccupied by fibers with a water blocking medium.

15. A method according to claim 14 comprising substantially filling regions of the grooves unoccupied by the tubes with a water blocking medium.

* * * * *